May 16, 1961     S. VITTORELLI     2,984,282
PNEUMATIC VEHICLE WHEEL TIRES
Filed June 29, 1959     2 Sheets-Sheet 1

INVENTOR
Sergio Vittorelli

BY Stevens, Davis, Miller & Mosher
ATTORNEYS

May 16, 1961  S. VITTORELLI  2,984,282
PNEUMATIC VEHICLE WHEEL TIRES
Filed June 29, 1959  2 Sheets-Sheet 2
FIG. 3.
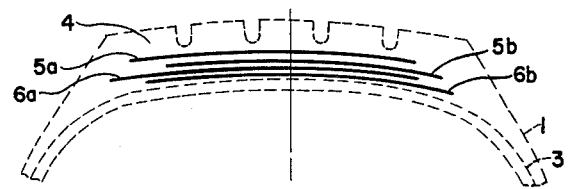
FIG. 6.
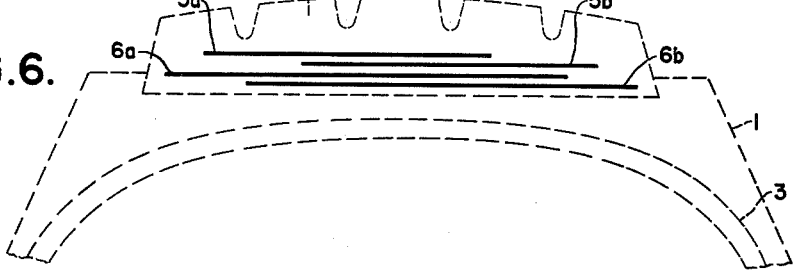
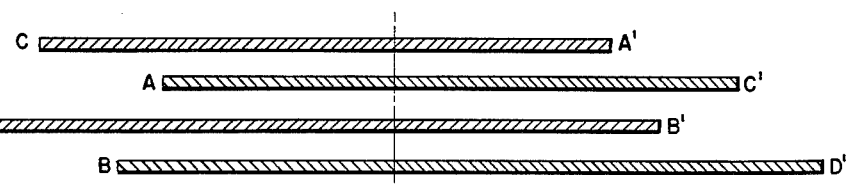
FIG. 5.
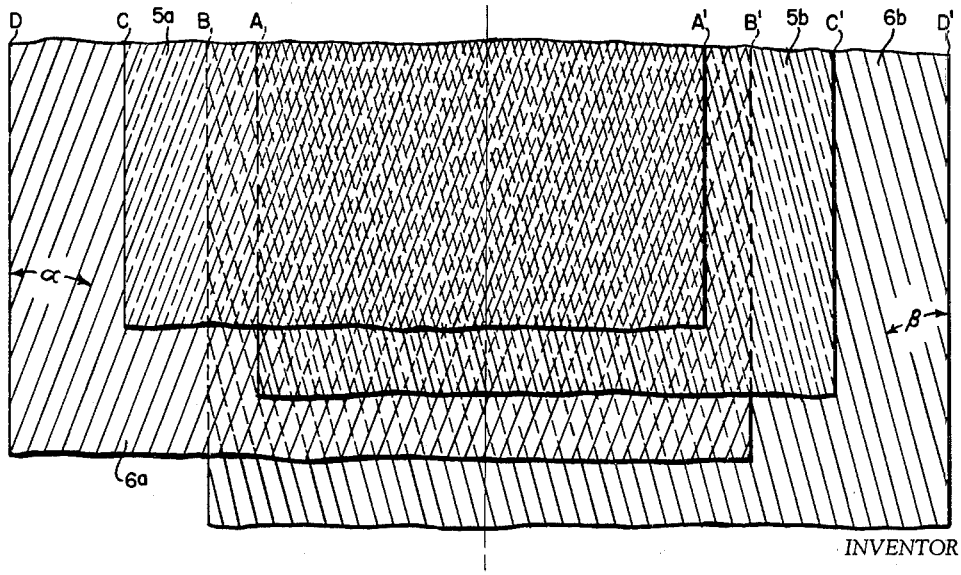
FIG. 4.
INVENTOR
Sergio Vittorelli
BY
Stevens, Davis, Miller & Mosher
ATTORNEYS

United States Patent Office 2,984,282
Patented May 16, 1961

2,984,282

PNEUMATIC VEHICLE WHEEL TIRES

Sergio Vittorelli, Monza, Italy, assignor to Pirelli S.p.A., Milan, Italy

Filed June 29, 1959, Ser. No. 823,667

Claims priority, application Italy July 5, 1958

7 Claims. (Cl. 152—361)

The present invention relates to pneumatic tires (for vehicle wheels) of the type provided with a belting structure capable of withstanding the tension stresses and placed under tension by the inner inflation pressure of the tire; this belting structure is ring-shaped and is composed of strips extending along the whole peripheral development of the tire in the portion below the tread; it is applied to a special carcass, such as to permit movements of the belting structure when the tire is squeezed on the ground in consequence of the load.

It is known that the purpose of the above described belting structure is to avoid variations in the circumferential development of the tire and, consequently, the continuous contractions and expansions which normally take place in the area of contact of the tire with the ground. The elimination of said movements, which would otherwise result in a creeping of the tread against the ground, considerably reduces the wear of the tread itself.

Particular belting structures, devised in order to allow a better adaptation of the tread to the ground, especially where the transversal section of the latter is not perfectly plane, and on the curves, are already known. For example, belting structures of the so-called "hinged" type, composed of three strips disposed side-by-side, or structures composed of folded strips with the folding lines situated at the tread edges, or structures composed of folded strips in which the folding lines are adjacent to the central part of the tread have already been carried out.

All of the realizations of belting structures which have been carried out to the present time, although they solve particular problems and represent considerable advantages and improvements, may have, in some cases and in special applications, some inconveniences of construction and/or of use. For example, the "hinged" structures show interruptions in the transversal direction and a sudden variation in the characteristics of longitudinal resistance in passing from the central strip to the lateral ones. The belting structures composed of folded strips with the folding lines at the tread edges can be advantageously employed with textile materials, but make difficult the adaptation of the tread when metallic materials are used. Moreover, the presence of folding lines at the central part of the tread causes sudden variations in the thickness of the belting structure which make advisable the addition of one or more layers of a normal breaker.

The discovery of the present invention involves a new form of construction of belting structure of the type having its cords inclined with respect to the equatorial plane of the tire which, in addition to all the advantages offered by the realizations already known, provides further improvements both in manufacture and in use, and which is capable of wider employment.

A principal object of the present invention, therefore, is to provide a pneumatic tire having improved belting structure, characterized in that the latter is composed of an even number of strips which, two by two (or in pairs), have the same width—smaller than the total width of the resulting belting structure—and are symmetrically superposed with respect to the equatorial plane so that the strips of each pair are partially overlapped. For a better understanding of the invention, and as will appear hereinafter, the strips whose midline is at the left of the equatorial plane shall be indicated with $a$ and the strips whose midline is at the right of said plane shall be indicated with $b$; each pair is therefore composed of a strip $a$ and of a strip $b$, which, as above said, have the same width.

The strips are made of cord fabric, that is, of a weftless fabric or a fabric having, at the most, sheer weft threads, embedded in a rubber compound; the cords of all the strips $a$ are parallel to one another (and so are those of all the strips $b$), and the angle formed by the cords of the strips $a$ with the equatorial plane, having a value ranging between 5° and 30°, is symmetrical to that formed with said plane by the cords at the strips $b$.

The cords constituting the strips are made of a natural, artificial or synthetic textile material of low extensibility, or of a metallic material, and are embedded in natural and/or synthetic rubber compounds. The width of the portion for which the strips are superposed in the various pairs varies according to the resistance desired for the belting structure; anyhow, the overlapping portion in each pair must not have a width greater than the ⅔ of the width of the pair.

The number and size of the strips forming the belting structure, as well as the width of the overlapped portions, are dependent on the type and size of the tire and on the use for which it is intended. The invention shall be better illustrated with reference to the attached drawings which represent, by way of non-limiting examples, two alternative embodiments of the invention.

Figure 3 is a diagrammatical cross-sectional view, similar to Figure 1, showing a pneumatic belting structure formed of two pairs of strips having a different width, which are overlapped for different portions;

Figure 4 is a fragmentary and diagrammatic plan view, similar to Figure 2, illustrating a portion of the belting structure shown in Figure 3, developed in plane;

Figure 5 is a diagrammatic cross-sectional view, taken at right angles to Figure 4, showing the overlapping relationship of the strips in greater detail; and Figure 6 is a diagrammatical cross sectional view, similar to Figure 3, showing essentially the same belting structure as applied to a removable tread.

Figure 1:
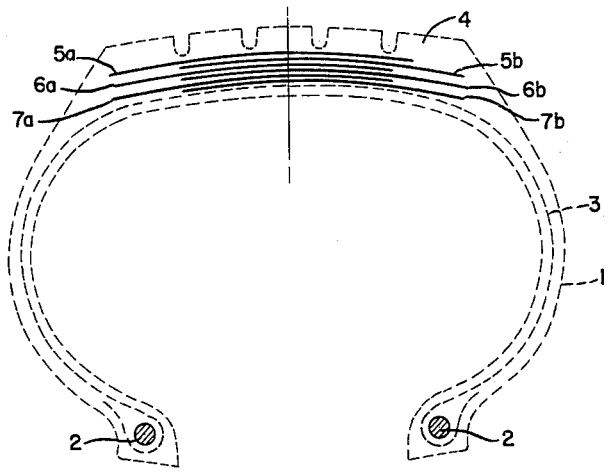
Figure 1 represents, in diagrammatical cross-section, a pneumatic tire constructed in accordance with the invention and provided with a belting structure formed of three pairs of strips having an equal width, which are overlapped for an equal portion.

Figure 1 illustrates an embodiment of the invention in which the belting structure is composed of three pairs $5a$, $5b$, $6a$, $6b$, $7a$ and $7b$ of strips having the same width, being overlapped in each pair for an equal portion. In the pneumatic tire generally designated by the reference numeral 1, the belting structure is situated between the tread 4 and the carcass plies 3; the carcass plies 3, diagrammatically indicated by a dotted line, are turned up in a conventional way about the bead wires 2. As previously stated, the letter $a$ indicates the strips at the left, and the letter $b$ those at the right of the equatorial plane of the tire.

Figure 2:
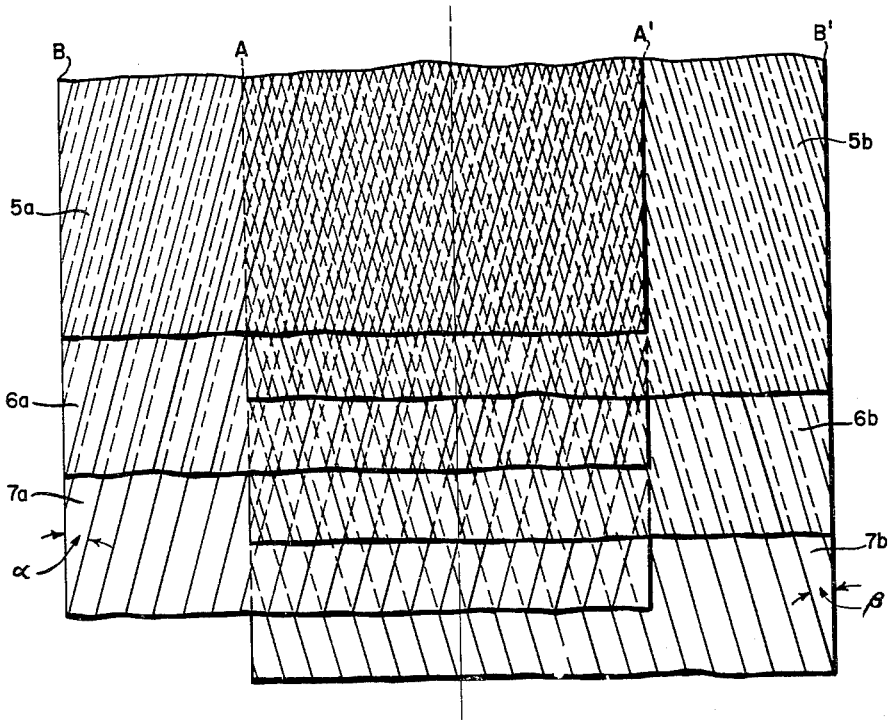
Figure 2 is a fragmentary and diagrammatic plan view of a portion of the belting structure shown in Figure 1, developed in plane.

A portion of the belting structure shown in Figure 1 is then developed in plane in Figure 2, in which the pairs of superposed strips are still indicated with the reference characters $5a$, $5b$, $6a$, $6b$, $7a$ and $7b$.

The strips $5a$, $6a$, $7a$ have their cords disposed along the same direction, which are inclined at an angle $\alpha$ with respect to the equatorial plane; analogous is the case of the strips $5b$, $6b$, and $7b$, and the angle $\beta$, formed by their cords with respect to the equatorial plane, is symmetrical to the angle $\alpha$. The overlapped portion AA' is at the center with respect to said plane and is nearly equal to one half of the width BB' of the various pairs; the angles of inclination $\alpha$ and $\beta$ of the cords to said plane have a value of 20°.

It is understood that possible alternative embodiments of the invention are those in which the width of the strips varies from one pair to the other, the two strips forming a pair always having an equal width; the variation in the width may take place increasingly or decreasingly from the carcass plies towards the tread.

Similarly, the width of the overlapped portion can vary from one pair to the other, increasingly or decreasingly from the carcass towards the tread. However, it is intended that the overlapped portion must not exceed ⅔ of the width of the corresponding pair and that the overlapped portion must be situated at the center with respect to the equatorial plane.

Therefore, Figure 3 illustrates a preferred form of the present invention which allows a more gradual variation in the thickness of the belting structure. Here, there is shown a transition from a simpler lateral structure, composed of a single strip and therefore of cords situated along a single direction, to a more complex central structure which is variously composed of the totality of the strips having crossed cords.

The belting structure consists of two pairs of strips $5a$, $5b$ and $6a$, $6b$ having different widths and different overlapped portions; the two pairs of strips $5a$, $5b$ and $6a$, $6b$ are situated between the tread and the carcass plies 3 of a pneumatic tire 1; the carcass plies 3, diagrammatically indicated by a dotted line, are turned up in a conventional way about the bead wires 2.

A portion of the belting structure of Figure 3 is then developed in plane in Figure 4 in which the pairs of superposed strips are still indicated with the references $5a$, $5b$ and $6a$, $6b$, the letter $a$ indicating the strips at the left and the letter $b$ those at the right. The strips $5a$ and $5b$, having equal widths CA' and AC', respectively, are overlapped for AA'; the strips $6a$ and $6b$, having equal widths DB' and BD', respectively, greater than CA', are overlapped for BB', greater than AA'; in each of the two pairs, the overlapped portion has a width equal to a little less than 9/10 of the width of its respective pair and is at the center with respect to the equatorial plane.

The belting structure is therefore composed of seven parts: a central portion AA' made of 4 strips having crossed cords; two portions BA and A'B', adjacent to the central portion and composed of three strips two of which have parallel cords and one having cords crossed with respect to the other two strips; two portions CB and B'C' adjacent to the preceding ones, composed of two strips having parallel cords and finally two external portions DC and C'D' made of single strips. Also, in this embodiment the angles $\alpha$ and $\beta$ of the cords, symmetrical to one another, have a value of 20°.

In accordance with the function of the above described belting structure, the carcass must be constructed in such a way as not to hinder its movements when the tire is squeezed against the ground in consequence of the load. This can be obtained with such a disposition of the carcass plies that the cords have a radial or nearly radial path, namely lying in planes containing the axis of rotation of the tire or forming small angles with respect to such planes, or else with other carcass structures behaving effectively in the manner of a radial carcass.

The pneumatic tires provided with a belting structure and with a carcass in accordance with the foregoing specification have, over the conventional realizations already known, remarkable advantages, the most important of which are the following:

(a) Good resistance to longitudinal tension, even though the cords are inclined with respect to the equatorial plane;

(b) Graduality of the total longitudinal resistance, which can be obtained by varying appropriately the width of the strips and that of the overlapped portion of the various pairs;

(c) Possibility of concentrating the longitudinal resistance in a more or less wide portion, by varying appropriately the difference in the width between the strips of the various pairs. (In this way it is possible to construct a tire having a maximum longitudinal indeformability in the central portion of the tread with a gradual decrease of same from the equatorial line to the sidewalls, which gives to the tire a greater adaptability to the ground, in particular where this is irregular or where its cross section is not perfectly horizontal, thus avoiding a concentration of the stresses, and consequently of the wear, at the tread edges, and improving the travelling comfort);

(d) Possibility of obtaining the desired longitudinal resistance by employing a suitable number of thin layers; this increases the radial flexibility and consequently the traveling comfort;

(e) Absence of lines of discontinuity in the whole structure, with a consequent increase of the safety coefficient of the carcass cords with respect to the transversal stresses. A savings of material in the carcass cords is consequently obtained with the same safety coefficient;

(f) Possibility of using the same type of cord fabric to manufacture a wide range of tires having various sizes, by suitably varying the number of the strips, their width and the width of the overlapped portions.

It should be understood that the present invention is not limited to the above described embodiments, which are given solely by way of example, but comprises all the other modifications or combinations deriving from the inventive principle above indicated.

In particular, the tire according to the invention can be composed of a tread separated from the carcass as shown in Figure 6; in this case the belting structure is incorporated in the separate tread 4'.

What is claimed is:

1. In a pneumatic tire of the type provided with a belting structure capable of withstanding the tension stresses and placed under tension by the inner inflation pressure of the tire and with a carcass allowing movements of said belting structure, the improvement wherein said belting structure is composed of a plurality of pairs of strips of cord fabric, each strip being made of cords of a material having a low extensibility and disposed parallel to one another, said strips of each pair having an equal width which is smaller than the total width of the belting structure, and being symmetrically superposed with respect to the equatorial plane so that each pair of strips is partially superposed for a width not greater than the ⅔ of the width of the pair, the cords of all the strips which have their midline at one side of the equatorial plane, being parallel to one another and inclined with respect to said plane for a first angle ranging between 5° and 30°, the cords of all the strips which have their midline at the other side of the equatorial plane and which are also formed of cords parallel to one another being inclined with respect to said plane for a second angle which is equal to said first angle but oppositely directed with respect thereto, whereby the cords of each strip are oppositely directed with respect to the cords in any adjacent strip.

2. A pneumatic tire as set forth in claim 1 in which all of the strips have an equal width and wherein all of the strips in all of the pairs are overlapped for an equal portion.

3. A pneumatic tire as set forth in claim 1 in which all the strips have an equal width and the width of the overlapped portions varies from one pair of strips to another.

4. A pneumatic tire as set forth in claim 1 in which the strips have a width different in each pair and wherein the widths of the overlapped portions are equal in all the pairs.

5. A pneumatic tire as set forth in claim 1 in which the strips have a different width in each pair and wherein the width of the overlapped portion varies from one pair to another.

6. A pneumatic tire as set forth in claim 5 in which the belting structure is composed of two pairs of strips having a width decreasing from the carcass to the tread, and in which the width of the overlapped portions decreases correspondingly from the carcass to the tread.

7. A pneumatic tire as set forth in claim 1 in which the tread is separated from the carcass and contains the belting structure.

References Cited in the file of this patent

FOREIGN PATENTS 550,080     Italy ------------------ Oct. 20, 1956